United States Patent [19]

Nygard

[11] Patent Number: 4,596,438
[45] Date of Patent: Jun. 24, 1986

[54] PLUG-IN CONTACT DEVICE
[75] Inventor: Martin Nygard, Västerås, Sweden
[73] Assignee: Asea Aktiebolag, Västerås, Sweden
[21] Appl. No.: 719,049
[22] Filed: Apr. 4, 1985

Related U.S. Application Data

[63] Continuation of Ser. No. 451,435, Dec. 20, 1982, abandoned.

[30] Foreign Application Priority Data

Dec. 23, 1981 [SE] Sweden ............................ 8107767

[51] Int. Cl.⁴ .............................................. H01R 11/22
[52] U.S. Cl. ................................................... 339/252 R
[58] Field of Search ........... 339/153 R, 154 R, 156 R, 339/252, 253, 255 R, 255 A, 255 B, 255 L, 255 P

[56] References Cited

U.S. PATENT DOCUMENTS

| | | | |
|---|---|---|---|
| 2,872,659 | 2/1959 | Wills | 339/255 P |
| 3,031,642 | 4/1962 | Gartner, Jr. | 339/255 P |
| 3,678,448 | 7/1972 | Young | 339/252 P |
| 3,821,691 | 6/1974 | Reimer | 339/253 R |
| 3,848,948 | 11/1974 | Soes | 339/252 P |
| 3,995,931 | 12/1976 | Pienkowski | 339/252 P |
| 4,227,596 | 10/1980 | Bartels | 191/23 A |
| 4,230,388 | 10/1980 | Thierry et al. | 339/255 R |

FOREIGN PATENT DOCUMENTS

| | | | |
|---|---|---|---|
| 2165940 | 7/1973 | Fed. Rep. of Germany | 339/255 R |
| 840456 | 1/1939 | France | 339/252 P |
| 2013422 | 8/1979 | United Kingdom | 339/252 R |
| 187863 | 10/1966 | U.S.S.R. | 339/255 R |

*Primary Examiner*—Gil Weidenfeld
*Assistant Examiner*—Gary F. Paumen
*Attorney, Agent, or Firm*—Watson, Cole, Grindle & Watson

[57] ABSTRACT

For use in low-voltage switchgear there is provided a plug-in contact device for connecting two bars, each of which has two confronting parallel contact surfaces. The contact device includes two co-acting elongated contact fingers which form two electrically parallel-connected current paths between the two bars. At the two end portions of the contact device the current paths intersect each other, whereas in a relatively long middle portion of the contact device the current paths are parallel and lie relatively close to each other, thus obtaining an electrodynamic contact pressure increase.

10 Claims, 15 Drawing Figures

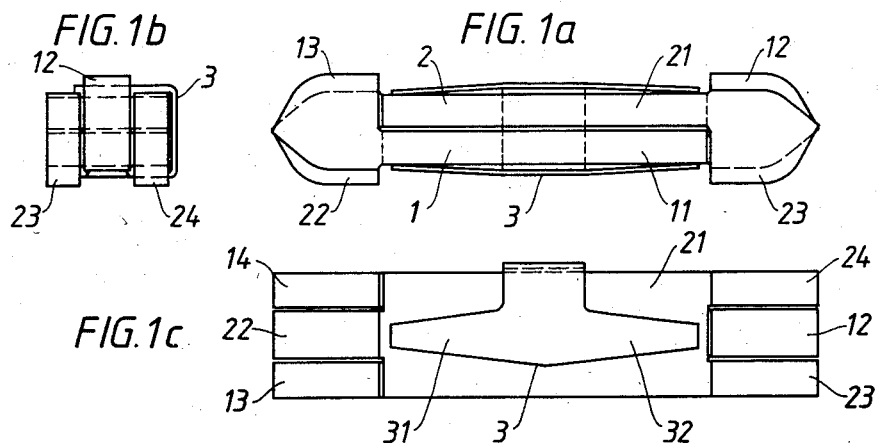
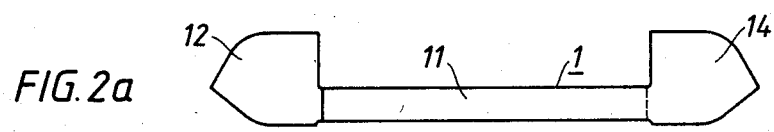
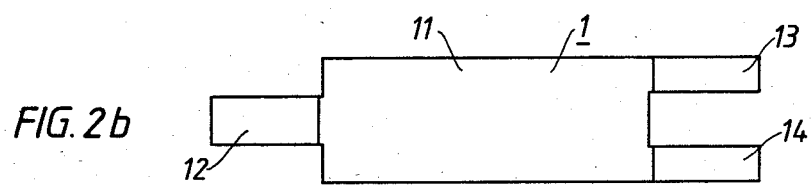
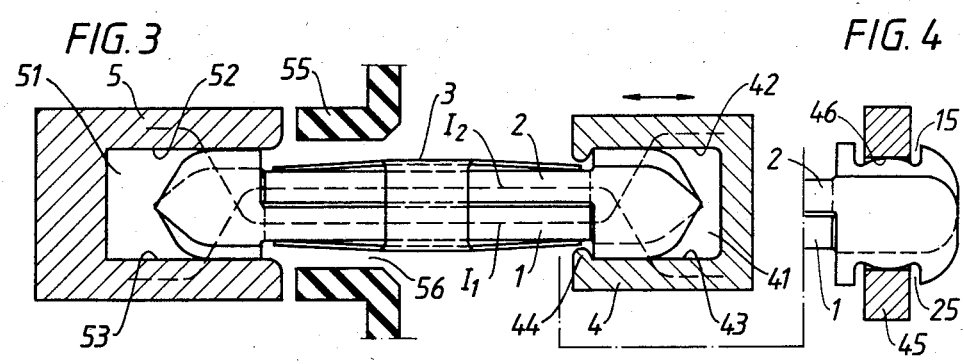
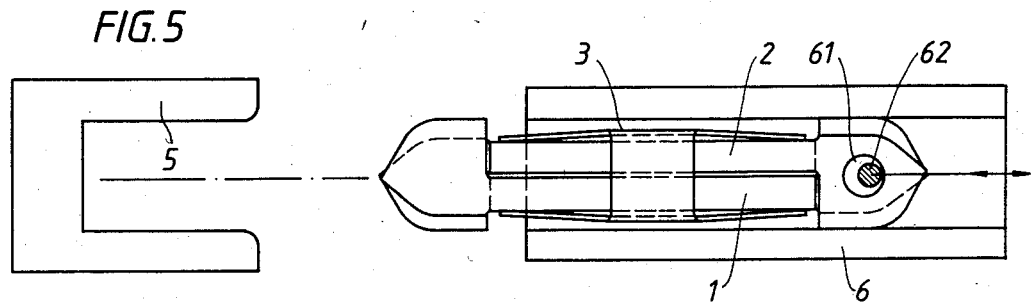

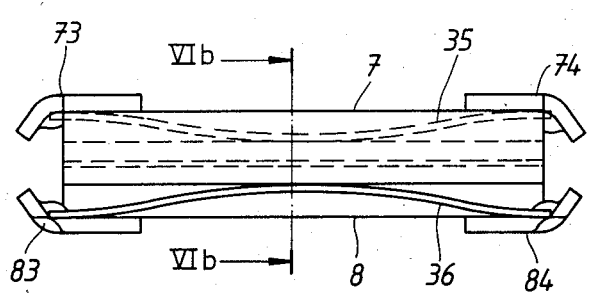
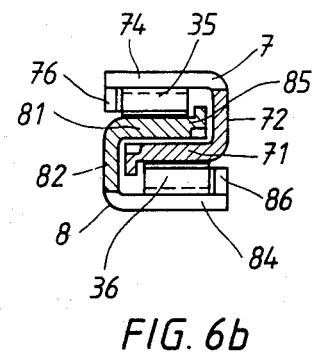
FIG. 6a  FIG. 6b
FIG. 7a
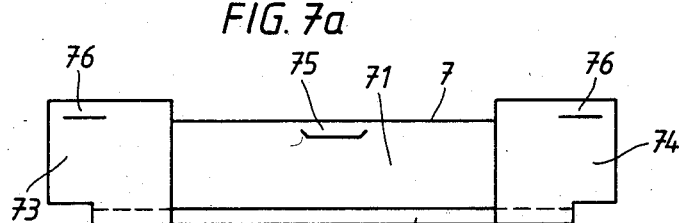
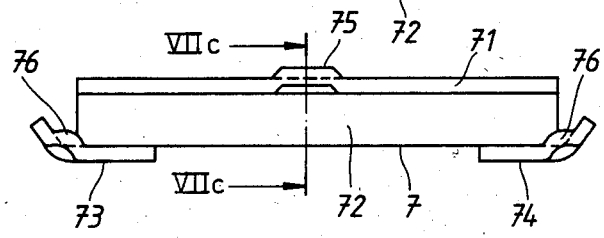
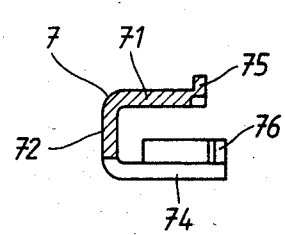
FIG. 7b  FIG. 7c
FIG. 8  FIG. 9
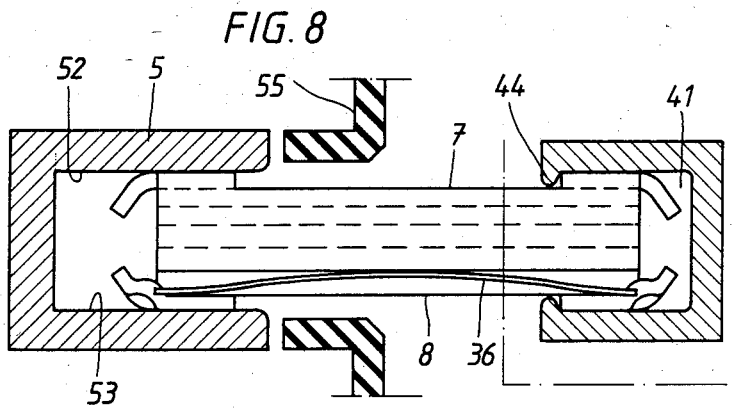
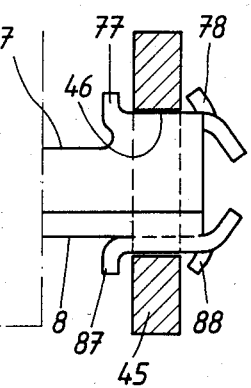

PLUG-IN CONTACT DEVICE

BACKGROUND OF THE INVENTION

This application is a continuation of application Ser. No. 451,435, filed Dec. 20, 1982, now abandoned.

1. Field of the Invention

This invention relates to a plug-in contact device for establishing electrical contact between a busbar and a withdrawable apparatus or apparatus group. The contact device is intended for use in electrical switchgear, in particular, but not exclusively, cubicle-enclosed switchgear for operating voltages of up to 1000 volts.

2. Prior Art

Withdrawable apparatus have to be provided with some form of plug-in contact device for connection of the main current paths to the busbars of the switchgear. In a completely semiprotected busbar system, these plug-in contact devices, in order to obtain a simple system, should be thin to be able to pass through slots in an insulating screen arranged in front of the busbars (the term "semi-protected busbar" means a busbar in which it is not possible to touch a live part of the bar with a standardized test finger positioned in any conceivable manner). The plug-in contact devices should have good reliability, be flexible, have low transition resistance and be short-circuit proof.

In a known embodiment of a plug-in contact device for withdrawable apparatus (see U.S. Pat. No. 4,227,596), the contact device comprises two contact fingers which form two electrically parallel-connected current paths between, on the one hand, a busbar with two confronting parallel contact surfaces and, on the other hand, a contact knife on the withdrawable apparatus. The current paths intersect each other at one end portion of the contact device and extend in parallel in a relatively long middle portion of the contact device, thus obtaining an electrodynamic contact pressure increase. The contact device is surrounded by an insulating housing which is fixedly mounted in, for example, a switchgear cubicle, one end of the contact device being in permanent connection with the busbar. Such a design has, among other things, the disadvantage that the contact device is difficult to access for inspection, since it is enclosed and fixedly mounted in the switchgear cubicle. Since it is normally the movable parts in equipment that need supervision, it is desirable to have as few movable parts as possible fixedly mounted in the cubicle. In addition, the insulating housing renders the contact device more expensive.

SUMMARY OF THE INVENTION

It is the primary object of the present invention to provide a plug-in contact device, intended for the above-mentioned field of application, which is simple and reliable, and which is also cheaper and easier to inspect than the known contact device described above. This is achieved, according to the invention, by a contact device which comprises two separated elongated contact fingers which form two electrically parallel-connected current paths, the contact fingers being formed so as to be close together and substantially parallel to one another along the middle portion of the contact device and to cross each other at the opposite end portions of the contact device, and spring means for providing a contact between the contact fingers and the contact surfaces of the bars which they electrically interconnect. Such a contact device can be easily mounted on the withdrawable apparatus without any auxiliary means, and since the contact device accompanies the apparatus, the contact device need not be surrounded by an insulating housing and it can easily be inspected without having to make the switchgear inoperative.

To obtain good control and contact abutment, the contact fingers are suitably formed so that each contact finger abuts the two contact bars it connects at three points. In this way, the contact device is relatively insensitive to torsional forces.

BRIEF DESCRIPTION OF THE DRAWINGS

The invention will now be explained in greater detail with reference to different embodiments shown in the accompanying drawings, in which FIGS. 1a, 1b and 1c show a first embodiment of a contact device according to the invention, FIG. 1a being a side view, FIG. 1b an end view and FIG. 1c a plan view, FIGS. 2a and 2b show one of the contact fingers included in the contact device according to FIGS. 1a–1c, FIG. 2a being a side view and FIG. 2b a plan view, FIG. 3 shows a contact device according to FIGS. 1a–1c in its operating position between a busbar and an apparatus bar, FIG. 4 shows a side view of one end portion of a modified design of the contact device according to FIGS. 1a–1c attached to an apparatus bar, FIG. 5 shows a contact device according to FIGS. 1a–1c used as a disconnector between a busbar and a fixedly mounted contact chamber, FIGS. 6a and 6b show a second embodiment of a contact device according to the invention, FIG. 6a being a side view and FIG. 6b a section along the line VIb–VIb in FIG. 6a, FIGS. 7a, 7b and 7c show one of the contact fingers included in the contact device according to FIGS. 6a and 6b, FIG. 7a being a plane view, FIG. 7b a side view and FIG. 7c being a section along the line VIIc–VIIc in FIG. 7b, FIG. 8 shows the contact device according to FIGS. 6a and 6b in its operating position between a busbar and an apparatus bar, and FIG. 9 shows a side view of one end portion of a modified embodiment of the contact device according to FIGS. 6a and 6b attached to an apparatus bar.

DESCRIPTION OF PREFERRED EMBODIMENTS

The plug-in contact device shown in FIGS. 1a–1c comprises two elongated contact fingers 1 and 2 and a surrounding spring 3. The two contact fingers, of which contact finger 1 is shown separately in FIGS. 2a and 2b, are exactly alike. The contact fingers 1, 2 include a plane rectangular middle portion 11 and 21, respectively, and two end portions extending in the same direction from the plane of the middle portion. The contact fingers are each symmetrical about a central plane passing therethrough, the central plane P of contact finger 1 being shown in FIG. 2b. Hereinafter this central plane will be called the plane of symmetry of each contact finger. One end portion of each finger consists of a middle contact tongue 12 and 22, respectively, lying in the plane of symmetry of the respective contact finger, whereas the other end portion consists of two side contact tongues 13, 14 and 23, 24, respectively, located on either side of the plane of symmetry. The distance between the side contact tongues is greater than the thickness of the middle wedge contact.

The contact fingers can suitably be manufactured by cutting the fingers from a profiled rod of copper or some other suitable contact material, and subsequently milling the ends to produce the contact tongues. It is also possible to manufacture the contact fingers by pressing directly to their final shape, possible after sintering of powdered material.

As is clear from FIGS. 1a–1c, the two contact fingers 1, 2 in the contact device face opposite directions and are positioned against each other, so that the middle contact tongue 12 of the contact finger 1 fits between the side contact tongues 23, 24 of the contact finger 2, whereas the middle contact tongue 22 of the contact finger 2 fits between the side contact tongues 13, 14 of the contact finger 1.

The spring 3 consists of a leaf spring, bent into substantially U-shape, which surrounds the contact fingers, the legs of the spring being formed with spring arms 31, 32 extending in opposite directions in the longitudinal direction of the contact fingers (FIG. 1c). With this shape, the contact points of the springs against the contact fingers will lie close to the contact tongues, and an efficient resilience at both ends of the contact device is obtained. To fix the spring, the outwardly-facing surfaces of the contacts fingers 1, 2 can suitably be provided with embossments or recesses into which the ends of the spring arms 31, 32 can engage.

FIG. 3 shows a contact device of the embodiment shown in FIGS. 1a–1c in a plugged-in position. The contact device is fixed in a longitudinal slot 41 in an apparatus bar 4, which is included in a withdrawable apparatus or apparatus group. The apparatus bar is provided with locking edges 44 which are arranged so that the contact device can be pressed into position, whereafter the locking edges retain the contact device in the bar. The two confronting sides 42, 43 of the slot constitute contact surfaces, with which the contact tongues in one end portion of the contact device make contact under pressure of the spring 3. The other end portion of the contact device makes contact, under spring pressure, with two confronting contact surfaces 52 and 53 in a busbar 5 provided with a forwardly-facing slot 51. Instead of such a busbar with a slot, a busbar consisting of two parallel bars can be used. In front of the busbar 5 there is arranged, as a semi-protection device, an insulating screen 55 provided with a slot 56. Through the two contact fingers of the contact device there are formed two electrically parallel-connected current paths $I_1$ and $I_2$ between the two bars 5 and 4. These current paths cross each other at both end portions of the contact device, whereas over a relatively long distance between the crossing points they are substantially parallel and are positioned relatively close to each other. In case of a short-circuit current, a considerable attractive force occurs between the parallel current paths, whereby the contact pressure is strengthened. This makes the contact device short-circuit proof.

A considerable advantage with the embodiment of the contact device shown in FIGS. 1a–1c is that each contact finger 1, 2 has three-point contact with the contact surfaces of the bars 4, 5. This results in a controlled movement of the contact fingers, and good contact at defined contact points is achieved, which, among other things, contributes to a low contact resistance. Since the contact tongues are solid and have an extension which is only somewhat smaller than the width of the slot 51 in the busbar 5, a supporting effect on the busbar is also achieved, for example during a short-circuit. In case of a short-circuit current, the slot walls of the busbar (or the two bars of a busbar consisting of two parallel bars) tend to become attracted, whereby there would be a risk of a remaining deformation of the contact device with a different embodiment of the contact device.

FIG. 4 shows how one end portion of the contact device can be modified so that the contact device can be fixed in an apparatus bar 45 which is provided with a rectangular hole 46, the dimensions of which are adapted to the transversal dimensions of the contact device. In the contact tongue 12 of the contact finger 1 and in the contact tongues 23 and 24 of the contact finger 2 in this embodiment, transversal slots 15 and 25, respectively, have been milled in such a way that the contact device can be snapped into the hole 46 and be retained there.

FIG. 5 shows how to arrange disconnection between a busbar 5 and a contact chamber 6 in a switching equipment by means of a plug-in contact according to the invention. In this case, the contact tongues at one end of the contact device are provided with a through-hole 61, into which a contact carrier 62 is attached. By its special construction, the contact device can be accomodated in the narrow space between the contact making surfaces of the contact chamber 6.

FIGS. 6a and 6b show a different embodiment of a contact device according to the invention. This contact device is manufactured by punching and bending of sheet metal and is therefore relatively inexpensive. The contact fingers in this contact device are not designed for contact according to the three-point principle, and the supporting effect present with the above-described embodiment is not to be found here. However, the contact device in this simpler embodiment can be used with advantage in many connections where the demands are not so high.

The contact devices shown in FIGS. 6a and 6b consist of two contact fingers 7 and 8 and two bent leaf springs 35 and 36. The contact fingers are in mutual engagement and are locked to each other by means of the leaf springs which, in addition, give the necessary contact pressure. The two contact fingers, of which contact finger 7 is shown separately in FIGS. 7a–7c, are exactly alike. The contact fingers 7, 8 have a plane rectangular base portion 71 and 81, respectively, with a longitudinal stiffening edge 72 and 82, respectively, extending at right angles to the base portion.

Each of the contact fingers has two contact tongues 73, 74 and 83, 84, respectively, arranged at the ends of the respective contact finger. The contact tongues are bent in from the stiffening edge at right angles thereto, whereby the contact tongues will substantially be located in a plane which is parallel to the base portion.

In the middle of the free longitudinal edge of the respective base portion and at the edge of the contact tongues, elevations 75, 85 and 76, 86, respectively, for fixing the leaf springs 35, 36 are pressed into the sheet metal. By the embodiment shown, the different components which are included in the contact device are locked to each other in a simple manner.

FIG. 8 shows a contact device of the embodiment shown in FIGS. 6a and 6b, fixed in an apparatus bar 4 on a withdrawable apparatus, said apparatus bar being provided with a longitudinal slot 41 with locking edges 44. The apparatus with the contact device mounted thereon is inserted to make contact with a busbar 5 fixedly mounted in a switchgear, said busbar 5 having confronting contact surfaces 52, 53.

FIG. 9 shows a modified embodiment of one end portion of the contact device according to FIGS. 6a and 6b. In this embodiment, locking lugs 77, 78 and 87, 88, respectively, are pressed up into the contact tongues 74, 84 of the contact fingers 7, 8, so that the contact device can be snapped into position and be retained in a rectangular hole 46 in an apparatus busbar 45.

The invention is not limited to the embodiments shown, but several variants are feasible. For example, the contact fingers in the contact device shown in FIGS. 1a–1c can also be manufactured by punching and bending of sheet metal. Each contact finger is then formed with a plane, rectangular middle portion and contact tongues bent up perpendicular to the plane of the middle portion. The middle contact tongue, which constitutes one end portion of the contact finger, is then formed by two sheet metal lugs pressed against each other.

According to another possible embodiment, the contact fingers are manufactured by punching out an elongated, substantially rectangular hole in an elongated, substantially rectangular sheet metal piece, whereupon the contact finger is formed by bending so that its middle portion will consist of two elongated arms located adjacent each other in spaced relationship and in different planes, and its end portions will consist of substantially U-shaped contact yokes connecting the ends of the arms. The distance between the outer surfaces of the legs of the contact yoke of one end portion is made smaller than the distance between the inner surfaces of the legs of the contact yoke of the other end portions, so that the end portions of the two contact fingers of the contact device fit together when the contact fingers are turned in different directions and are positioned against each other. In this case, the contact pressure spring can suitably consist of a wire spring which is arranged in the symmetry plane of the contact device between the four arms of the two contact fingers and which extends between the end portions of the contact device and rests against the base portions of the contact yokes.

A plurality of contact devices of the embodiment shown can be arranged in parallel for adaptation to electrical equipment of different current ratings.

I claim:

1. An elongated plug-in contact device capable of electrically connecting two bars, each bar having two spaced-apart contact surfaces which are parallel to one another, said contact device being supportable at one end by one of said bars while being longitudinally displaced relative to the other bar, said contact device comprising a first contact finger which includes a flat middle portion and opposite end portions, said middle portion having a flat upper surface and a flat lower surface and said end portions extending above a plane defined by said flat upper surface, a separated second contact finger which includes a flat middle portion and opposite end portions, said middle portion having a flat upper surface and a flat lower surface and said end portions extending below a plane defined by said flat lower surface, said first and second fingers being substantially identical and positioned relative to one another such that the flat upper surface of said first finger faces the flat lower surface of said second finger and such that the opposite end portions of said first finger extend above the plane of the flat upper surface of said second finger and the opposite end portions of said second finger extend below the plane of the flat lower surface of said first finger, one end portion of each contact finger comprising a middle contact tongue lying in a plane of symmetry of the contact finger, the other end portion of the contact finger comprising two side contact tongues lying at either side of the plane of symmetry, the distance between said side contact tongues being greater than the thickness of the middle contact tongue, said two contact fingers of the contact device facing in opposite directions such that the middle contact tongue of each contact finger enters between the side contact tongue of the co-acting contact finger, and spring means contacting said first and second fingers so as to bias said middle portions thereof towards one another and to cause the opposite end portions to contact the opposite contact surface of said two bars when said contact device is connected therebetween.

2. A contact device according to claim 1, wherein said spring means is a leaf spring which is bent into a substantially U-shape and surrounds the contact fingers, the legs of said leaf spring comprising spring arms extending in opposite directions in the longitudinal direction of the contact fingers.

3. A contact device according to claim 1, wherein the contact tongues at one end of the contact device are provided with transversal slots which are adapted to the shape of a hole in one of said bars, into which the contact device is intended to be snapped and retained.

4. A contact device according to claim 1, wherein the contact tongues at one end of the contact device are provided with a through-hole for attachment of a contact carrier.

5. A plug-in contact device adapted to electrically connect two bars, each of which has two confronting, spaced apart parallel contact surfaces, said contact device being supportable by one of said bars and being displaceable in its longitudinal direction relative to the other bar, said contact device comprising two separated co-acting elongated contact fingers forming two electrically parallel-connected current paths between the two bars, said contact fingers being substantially identical and arranged with their longitudinal axes substantially parallel to each other and to said contact surfaces and being movable relative to each other in a direction substantially perpendicular to said contact surfaces, each contact finger comprising a substantially flat middle portion and two end portions extending in the same direction from the plane of the middle portion, one end portion of each contact finger comprising a middle contact tongue lying in a plane of symmetry of the contact finger, the other end portion of the contact finger comprising two side contact tongues lying at either side of the plane of symmetry, the distance between said side contact tongues being greater than the thickness of the middle contact tongue, said two contact fingers of the contact device facing in opposite directions such that the middle contact tongue of each contact finger enters between the side contact tongues of the co-acting contact finger, and separate spring means for providing contact pressure between said contact fingers and the contact fingers of said bars, said contact fingers being formed so that they cross each other at both end portions of the contact device and, in a relatively long middle portion of the contact device, are substantially parallel and lie relatively close to each other for achieving an electrodynamic contact pressure increase when current flows through the contact device.

6. A contact device according to claim 5, wherein said spring means is a leaf spring which is bent into a substantially U-shape and surrounds the contact fingers, the legs of said leaf spring comprising spring arms extending in opposite directions in the longitudinal direction of the contact fingers.

7. A contact device according to claim 5, wherein the contact tongues at one end of the contact device are provided with transversal slots which are adapted to the shape of a hole in one of said bars, into which the contact device is intended to be snapped and retained.

8. A contact device according to claim 5, wherein the contact tongues at one end of the contact device are provided with a through-hole for attachment of a contact carrier.

9. A plug-in contact device adapted to electrically connect two bars, each of which has two confronting, spaced apart parallel contact surfaces, said contact device being supportable by one of said bars and being displaceable in its longitudinal direction relative to the other bar, said contact device comprising two non-unitary co-acting elongated contact fingers forming two electrically parallel-connected current paths between the two bars, said contact fingers being manufactured by punching and bending of sheet metal and formed with a plane rectangular base portion with a longitudinal stiffening edge bent up at right angles to said base portion, and with two end portions in the form of contact tongues each bent in from the stiffening edge at the ends of the contact finger, said contact fingers being arranged with their longitudinal axes substantially parallel to each other and to said contact surfaces and being movable relative to each other in a direction substantially perpendicular to said contact surfaces, and separate spring means for providing contact pressure between said contact fingers and the contact surfaces of said bars, said contact fingers being arranged so that the base portion of each finger is situated between the base portion and the contact tongues of the other finger and so that the base portions are substantially parallel and lie relatively close to each other for achieving an electrodynamic contact pressure increase when current flows through the contact device.

10. A contact device according to claim 9, wherein said spring means comprises two curved leaf springs arranged on opposite sides of the contact device, the middle portion of each leaf spring resting against the base portion of one of the contact fingers and its ends abutting against the inner side of the contact tongues of the other contact finger.

* * * * *